(12) United States Patent
Banerjee et al.

(10) Patent No.: US 12,546,432 B2
(45) Date of Patent: Feb. 10, 2026

(54) MOUNTING SYSTEM FOR MOUNTING A MEDICAL COMPUTER TO A HOSPITAL BOOM ASSEMBLY

(71) Applicant: Boston Scientific Scimed, Inc., Maple Grove, MN (US)

(72) Inventors: Ankush Banerjee, Minneapolis, MN (US); Christopher John Sperry, Plymouth, MN (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 124 days.

(21) Appl. No.: 18/526,160

(22) Filed: Dec. 1, 2023

(65) Prior Publication Data
US 2024/0183483 A1 Jun. 6, 2024

Related U.S. Application Data

(60) Provisional application No. 63/429,400, filed on Dec. 1, 2022.

(51) Int. Cl.
*F16M 11/04* (2006.01)
*A61B 50/10* (2016.01)
*F16M 13/02* (2006.01)

(52) U.S. Cl.
CPC ............. *F16M 11/04* (2013.01); *A61B 50/10* (2016.02); *F16M 13/02* (2013.01)

(58) Field of Classification Search
CPC ......... A61B 50/10; A61B 50/13; A61B 50/26; A61G 12/001; F16M 11/04; F16M 13/02
See application file for complete search history.

(56) References Cited

U.S. PATENT DOCUMENTS

| | | | | |
|---|---|---|---|---|
| 6,138,583 A | * | 10/2000 | Mahone | A47B 57/42 211/187 |
| 7,490,837 B2 | * | 2/2009 | Pond | A61B 17/00 433/79 |
| 8,191,837 B2 | * | 6/2012 | Chen | G06F 1/1607 248/176.1 |
| 9,218,019 B2 | * | 12/2015 | Quijano | F16M 13/02 |
| 10,492,316 B2 | * | 11/2019 | Sung | G06F 1/1601 |
| 10,792,206 B2 | * | 10/2020 | Soytürk | A61G 12/001 |
| 11,187,254 B2 | * | 11/2021 | Chou | F16B 21/02 |

(Continued)

FOREIGN PATENT DOCUMENTS

EP 3556337 A1 * 10/2019 .......... A61G 12/001

*Primary Examiner* — Eret C McNichols
(74) *Attorney, Agent, or Firm* — Seager, Tufte & Wickhem, LLP

(57) ABSTRACT

Mounting systems for mounting a medical computer to a hospital boom assembly are disclosed. An example mounting system may include a computer securing member configured to be secured to a medical computer. The computer securing member may have a base and a top flange. The mounting system may also include universal bracket member configured to be coupled to the computer securing member. The universal bracket member may have a computer compartment configured to receive the medical computer and the computer securing member. The universal bracket member may include a mounting interface comprising a plurality of mounting apertures. The universal bracket member may be configured to engage a mounting bracket associated with a hospital boom assembly.

14 Claims, 8 Drawing Sheets

(56) References Cited

U.S. PATENT DOCUMENTS

| | | | |
|---|---|---|---|
| 11,415,264 B2* | 8/2022 | Bullock | H05K 5/0204 |
| 11,833,689 B2* | 12/2023 | Offengenden | B25J 9/162 |
| 12,207,977 B2* | 1/2025 | Allen | A61B 3/0041 |
| 2009/0052128 A1* | 2/2009 | Yeh | F16M 11/041 |
| | | | 361/679.27 |
| 2015/0289651 A1* | 10/2015 | Floersch | F16M 11/22 |
| | | | 248/300 |
| 2022/0164010 A1* | 5/2022 | Quijano | G06F 1/1681 |
| 2023/0335978 A1* | 10/2023 | Alvarez | H02G 11/02 |
| 2024/0180661 A1* | 6/2024 | Banerjee | A61B 50/13 |
| 2024/0184339 A1* | 6/2024 | Hieb | G06F 1/166 |
| 2024/0390101 A1* | 11/2024 | Schreiber | A61G 12/004 |
| 2024/0431059 A1* | 12/2024 | Wengreen | F16M 11/041 |

* cited by examiner

MOUNTING SYSTEM FOR MOUNTING A MEDICAL COMPUTER TO A HOSPITAL BOOM ASSEMBLY

CROSS-REFERENCE TO RELATED APPLICATIONS

This application claims the benefit of priority under 35 U.S.C. § 119 of U.S. Provisional Application No. 63/429,400, filed Dec. 1, 2022, the entire disclosure of which is hereby incorporated by reference.

TECHNICAL FIELD

The present disclosure pertains to medical devices, and methods for manufacturing medical devices. More particularly, the present disclosure pertains to mounting systems for mounting a medical computer to a hospital boom assembly.

BACKGROUND

A wide variety of medical devices have been developed for medical use, for example, intravascular use. Some of these devices include guidewires, catheters, and the like. These devices may be used with medical computers and/or hospital systems (e.g., such as hospital boom assemblies). Of the known medical devices and methods, each has certain advantages and disadvantages. There is an ongoing need to provide alternative medical devices as well as alternative methods for manufacturing and using medical devices.

BRIEF SUMMARY

This disclosure provides design, material, manufacturing method, and use alternatives for medical devices. A mounting system for mounting a medical computer to a hospital boom assembly is disclosed. The mounting system comprises: a computer securing member configured to be secured to a medical computer, the computer securing member having a base and a top flange; a universal bracket member configured to be coupled to the computer securing member, the universal bracket member having a computer compartment configured to receive the medical computer and the computer securing member; wherein the universal bracket member includes a mounting interface comprising a plurality of mounting apertures; and wherein the universal bracket member is configured to engage a mounting bracket associated with a hospital boom assembly.

Alternatively or additionally to any of the embodiments above, the computer securing member includes an accessory holding region.

Alternatively or additionally to any of the embodiments above, the accessory holding region includes a plurality of hook members.

Alternatively or additionally to any of the embodiments above, the mounting apertures are arranged in a pattern configured to be secured a plurality of different mounting brackets.

Alternatively or additionally to any of the embodiments above, a vertical slot is formed in the universal bracket member.

Alternatively or additionally to any of the embodiments above, the computer compartment of the universal bracket member is configured to house a first portion of the computer securing member and the vertical slot is configured to allow a second portion of the computer securing member to extend therethrough.

A medical system is disclosed. The medical system comprises: a boom assembly, the boom assembly including a frame and one or more displays coupled to the frame; a mounting bracket coupled to the frame; a mounting system coupled to the mounting bracket, the mounting system comprising: a computer securing member configured to be secured to a medical computer, the computer securing member having a base and a top flange, a universal bracket member configured to be coupled to the computer securing member, the universal bracket member having a computer compartment configured to receive the medical computer and the computer securing member, and wherein the universal bracket member includes a mounting interface comprising a plurality of mounting apertures.

Alternatively or additionally to any of the embodiments above, the computer securing member includes an accessory holding region.

Alternatively or additionally to any of the embodiments above, the accessory holding region includes a plurality of hook members.

Alternatively or additionally to any of the embodiments above, the mounting apertures are arranged in a pattern configured to be secured a plurality of different mounting brackets.

Alternatively or additionally to any of the embodiments above, a vertical slot is formed in the universal bracket member.

Alternatively or additionally to any of the embodiments above, the computer compartment of the universal bracket member is configured to house a first portion of the computer securing member and the vertical slot is configured to allow a second portion of the computer securing member to extend therethrough.

Alternatively or additionally to any of the embodiments above, the mounting apertures are configured to receive fasteners.

Alternatively or additionally to any of the embodiments above, the mounting bracket includes a plurality of mounting bracket apertures and wherein the mounting apertures are aligned with the mounting bracket apertures.

A method for mounting a medical computer to a hospital boom system is disclosed. The method comprises: securing a medical computer to a computer securing member, the computer securing member having a base and a top flange; coupling the medical computer and the computer securing member to a universal bracket member; wherein coupling the medical computer and the computer securing member to a universal bracket member includes disposing the medical computer and the computer securing member within a computer compartment defined within the universal bracket member; wherein the universal bracket member includes a mounting interface comprising a plurality of mounting apertures; and securing the universal bracket member to a mounting bracket associated with a hospital boom assembly.

Alternatively or additionally to any of the embodiments above, a vertical slot is formed in the universal bracket member.

Alternatively or additionally to any of the embodiments above, the computer compartment of the universal bracket member is configured to house a first portion of the computer securing member and the vertical slot is configured to allow a second portion of the computer securing member to extend therethrough.

Alternatively or additionally to any of the embodiments above, the mounting apertures are arranged in a pattern configured to be secured a plurality of different mounting brackets.

Alternatively or additionally to any of the embodiments above, the mounting apertures are configured to receive fasteners.

Alternatively or additionally to any of the embodiments above, the mounting bracket includes a plurality of mounting bracket apertures and wherein the mounting apertures are aligned with the mounting bracket apertures.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
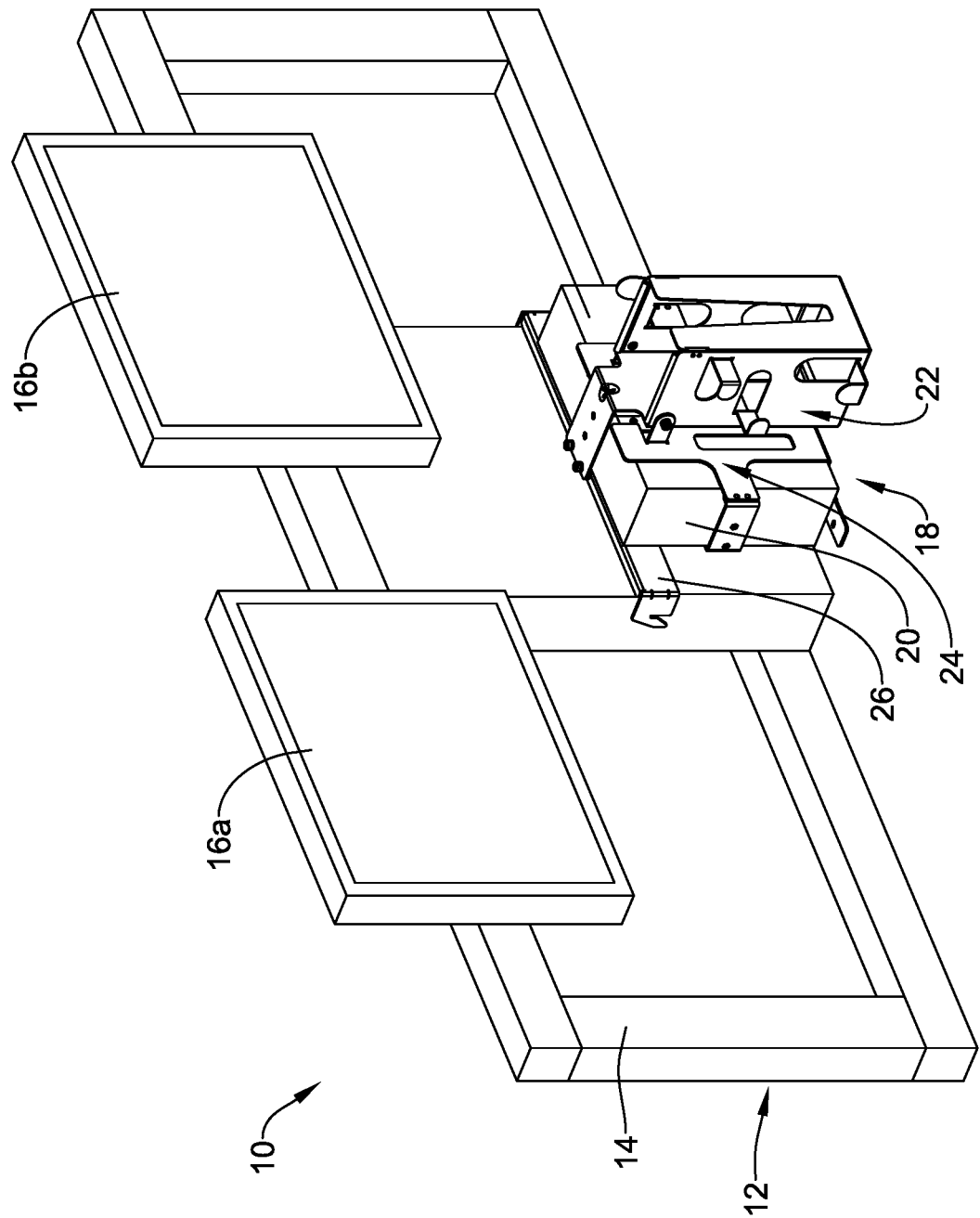
FIG. 1 is a plan view of an example system.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

A number of hospitals and/or clinical facilities include rooms, suites, and the like that utilize larger-scale capital equipment. In some instances, this capital equipment may include frameworks or boom assemblies that may be used to mount displays, computers, and/or the like. The boom assemblies (e.g., which may include a boom arm) may be an existing boom arm/assembly or a dedicated boom arm/assembly. The various boom assemblies are available from a number of different manufactures. Thus, hardware for mounting a variety of different medical device systems (e.g., including systems made by different manufacturers) requires a mounting bracket compatible with the specific boom assembly. Thus, mounting medical hardware to the boom assembly may require a variety of different mounting brackets, each being compatible with a particular brand of boom assembly. Disclosed herein are mounting systems for mounting medical devices (e.g., medical computers, etc.) to a boom assembly. The disclosed mounting systems utilize a universal mounting bracket member, thereby allowing the mounting systems to be compatible with a variety of different boom assemblies.

FIG. 1 illustrates an example system 10. In general, the system 10 may be used in a hospital environment. The system 10 may include a boom assembly 12 including a frame 14. One or more monitors or displays, such as displays 16*a*, 16*b*, may be coupled to the frame 14. While the boom assembly 12 is schematically depicted in FIG. 1, it can be appreciated that a number of different structures and/or configurations are contemplated. A mounting system 18 may be used to mount a medical computer 20 and/or other components of a medical device system to the boom assembly 12. For example, a medical device system that may be used with the boom assembly 12 may include an imaging system such as an intravascular ultrasound (IVUS) imaging system. As such, the medical computer 20 may be a computer for use with the IVUS imaging system. Other medical device systems and/or devices are contemplated.

The mounting system 18 may include a computer securing member 22. A universal bracket member 24 may be coupled to the computer securing member 22. As the name suggests, the computer securing member 22 may be attached and/or secured to the medical computer 20. The computer securing member 22, in turn, may be secured to the universal bracket member 24. The universal bracket member 24 may be configured to attached to a number of different mounting brackets (e.g., such as the mounting bracket 26 depicted in FIG. 1), which allows for the mounting system 18 to be mounted to the boom assembly 12. As will be discussed herein, the universal bracket member 24 may have a variety of openings and/or apertures that are compatible with mounting brackets compatible with differing boom assemblies 12. For example, an example boom assembly 12 may be used in conjunction with a first type of mounting bracket and another example boom assembly 12 may be used in conjunction with a second type of mounting bracket. The universal bracket member 24 may be configured for use with both types of mounting brackets, thereby allowing the mounting system 18 to be compatible with a variety of different boom assemblies 12. In some of these and in other instances, the universal bracket member 24 may be directly attachable to the boom assembly 12 without needing to have a mounting bracket 26 therebetween.

Figure 2:
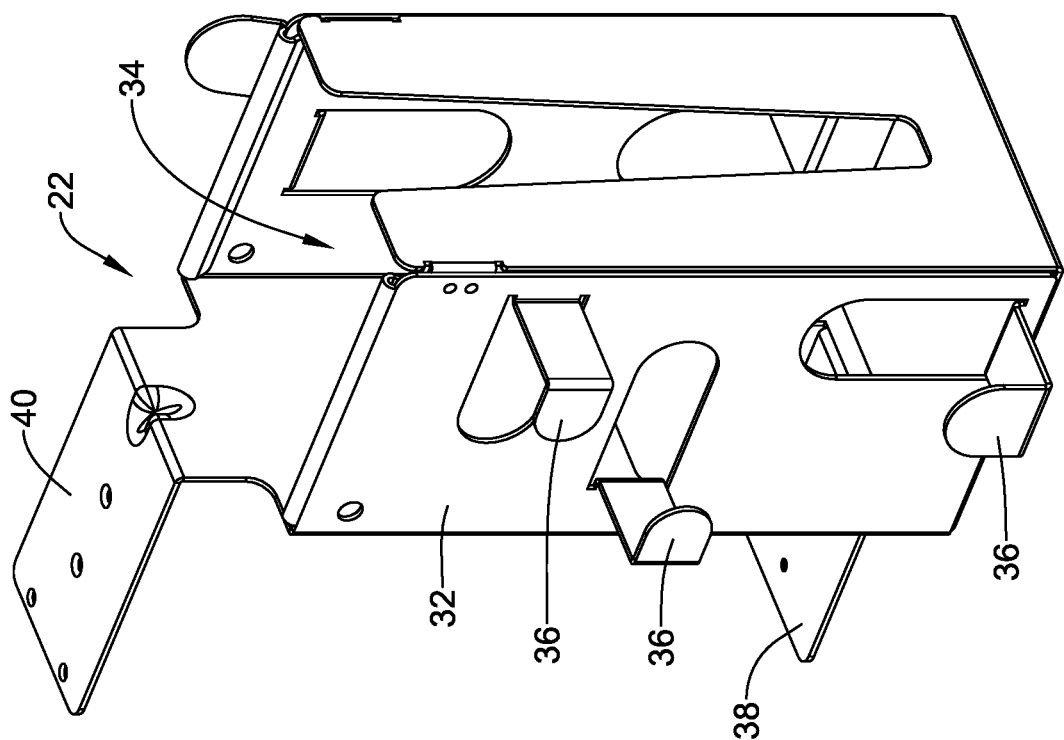
FIG. 2 is a perspective view of an example computer securing member.
Figure 3:
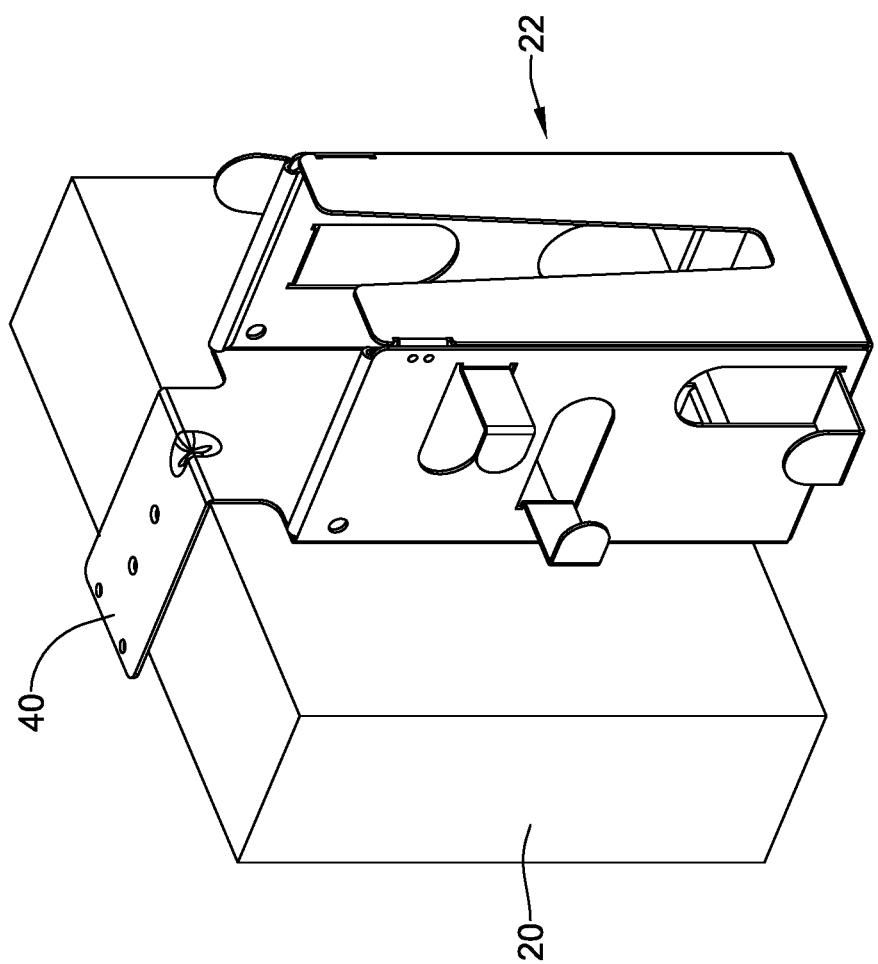
FIG. 3 is a perspective view of a medical computer secured to an example computer securing member.

FIG. 2 is a perspective view of the computer securing member 22. The computer securing member 22 may include a base 38 and a top panel or flange 40. In general, a medical computer (e.g., the medical computer 20) may be disposed along the base 38. If desired, the medical computer can be secured to the base 38 using a suitable fastener (e.g., a bolt, screw, and/or the like) that may pass through an opening in the base 38 and attached to the medical computer. Likewise, the top panel 40 may also be secured to the medical computer (e.g., using a fastener extending through openings in the top panel 40. FIG. 3 depicts the computer securing member 22 secured to the medical computer 20. The computer securing member 22 may be configured to allow for generally unimpeded airflow adjacent to the medical computer 20.

The computer securing member 22 may include one or more side walls or panels 32. The side panels 32 may help to define an accessory compartment 34. In general, the accessory compartment 34 may be used to house tools/accessories such as cables, a motor drive unit, a pullback sled, and/or the like. One or more hook members 36 may be disposed along the side panels 32. The hook members 36 may be used for cord management and/or to hang tools/accessories for use as part of an intervention.

Figure 4:
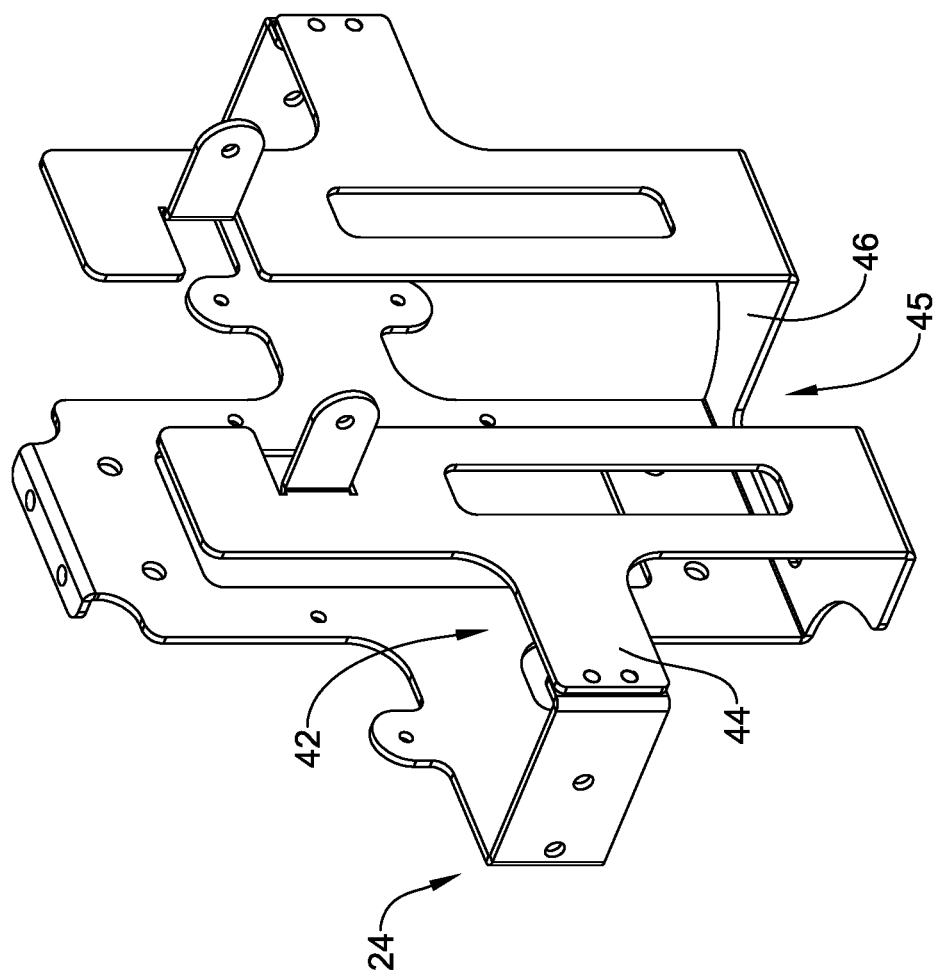
FIG. 4 is a perspective view of an example universal bracket member.

FIG. 4 is a perspective view of the universal bracket member 24. The universal bracket member 24 may include a frame 44 having a base 46. A computer compartment 42 may be defined within the universal bracket member 24. In general, the computer compartment 42 is configured to receive the medical computer 20 (e.g., when secured to the computer securing member 22). A vertical slot 45 may be formed along the universal bracket member 24. In general, the vertical slot 45 may be configured to allow the accessory compartment 34 to be disposed adjacent to the universal bracket member 24.

Figure 5:
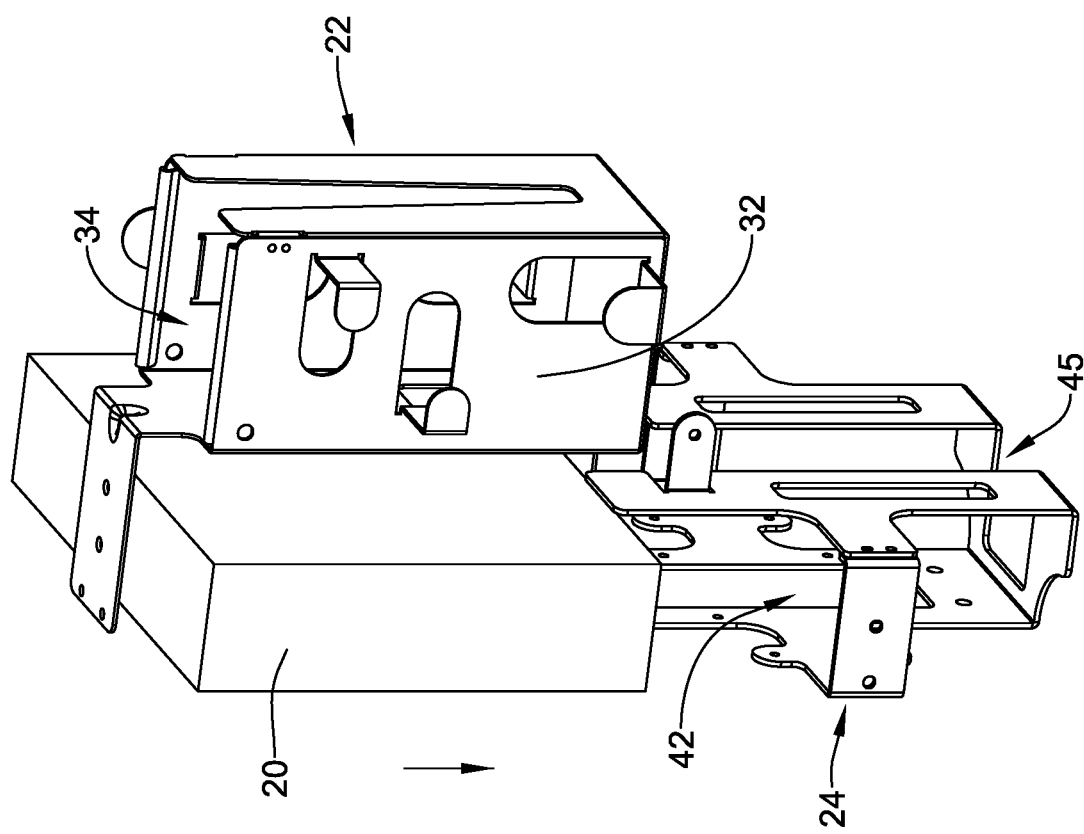
FIG. 5 depicts an example medical computer and computer securing member being coupled to an example universal bracket member.
Figure 6:
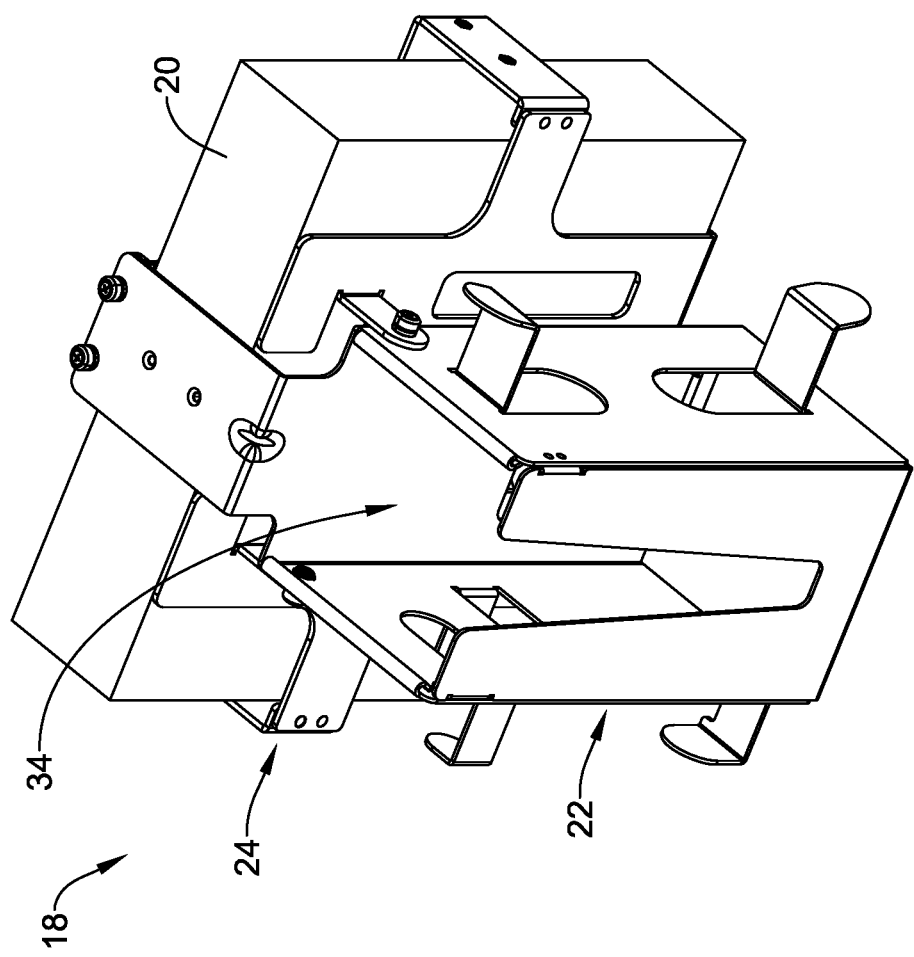
FIG. 6 is a perspective view of an example medical computer and computer securing member coupled to an example universal bracket member.

FIG. 5 illustrates the computer securing member 22 (e.g., having the medical computer 20 secured thereto) being coupled to the universal bracket member 24. This may include sliding the computer securing member 22 and medical computer 20 into the universal bracket member 24. In at least some instances, the computer securing member 22 is configured so that the computer securing member 22 may be slid into the universal bracket member 24 by a single user. The medical computer 20 may be disposed in the computer compartment 42. The side panels 32 defining the accessory compartment 34 may extend along the vertical slot 45. A rear view of the computer securing member 22 (e.g., having the medical computer 20 secured thereto) coupled to the universal bracket member 24 is shown depicted in FIG. 6.

Figure 7:
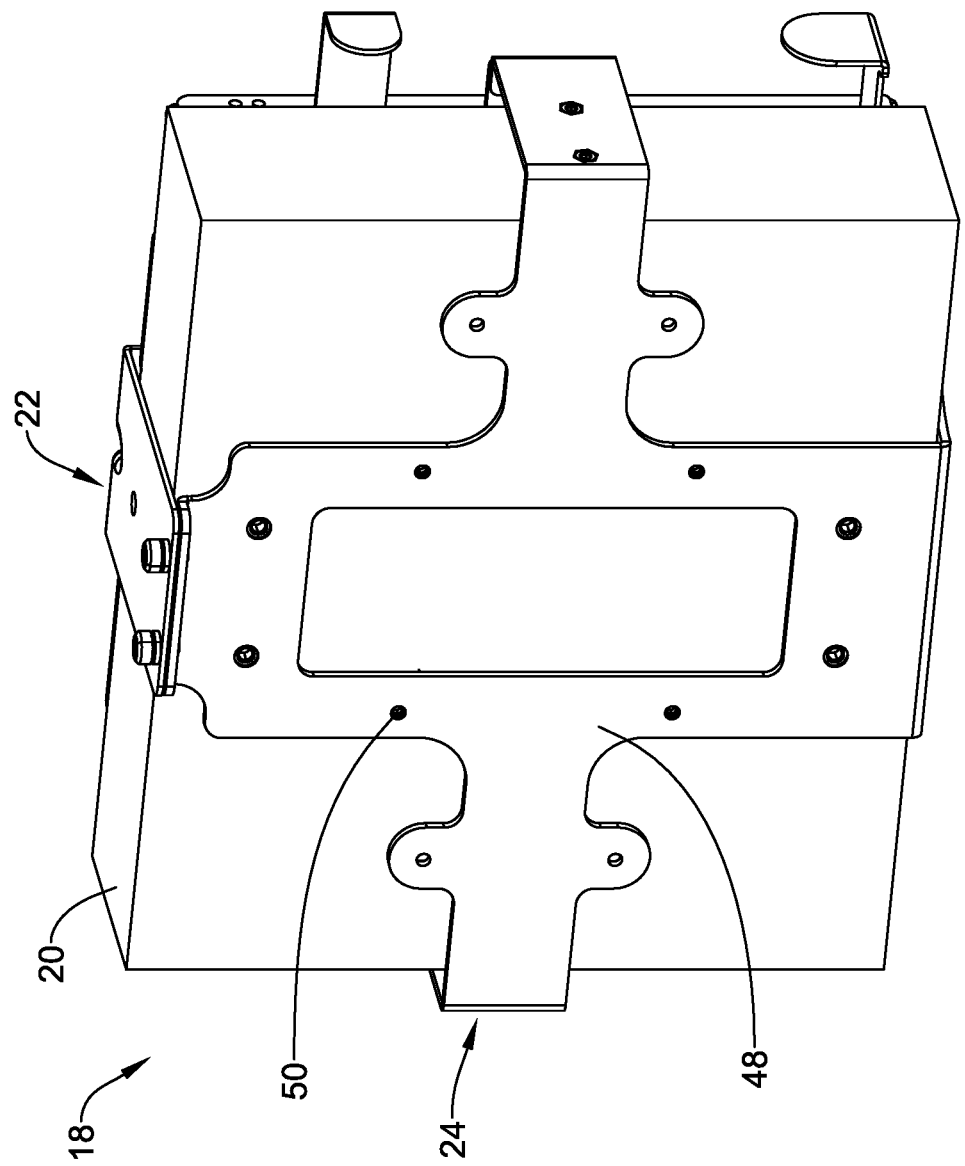
FIG. 7 is a perspective view of an example medical computer and computer securing member coupled to an example universal bracket member.
Figure 8:
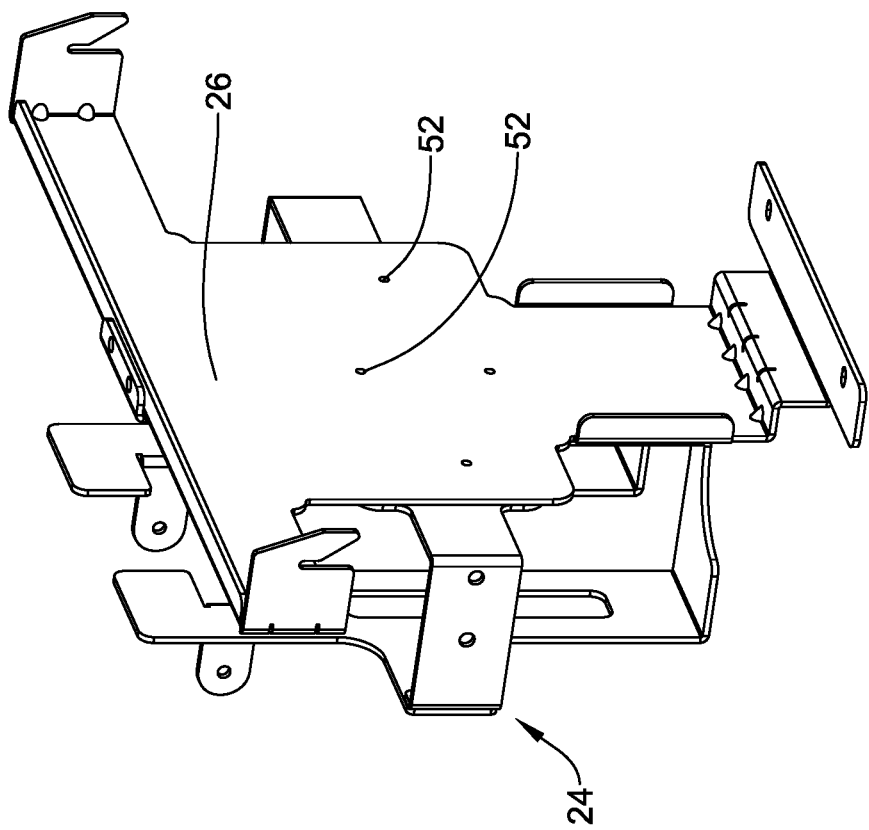
FIG. 8 is a perspective view of an example universal bracket member coupled to a mounting bracket.

FIG. 7 illustrates a front panel 48 of the universal bracket member 24. The front panel 48 may include a number of mounting apertures 50, which may be used to secure the universal bracket member 24 to the mounting bracket 26. The mounting apertures 50 may be arranged (e.g., in a number of patterns) to be compatible with a variety of different mounting brackets. For example, FIG. 8 illustrates the universal bracket member 24 secured to the mounting bracket 26. In some instances, the mounting bracket 26 may include mounting bracket apertures 52. The mounting bracket apertures 52 may be aligned with the mounting apertures 50 of the front panel 48 of the universal bracket member 24. Suitable fasteners (e.g., bolts, screws, etc.) may be extending through the apertures 50, 52 to secure the universal bracket member 24 to the mounting bracket 26. Another grouping of mounting apertures 50 may be used to secure the universal bracket member 24 to a different type of mounting bracket 26 and/or to the boom assembly 12 directly.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A mounting system for mounting a medical computer to a hospital boom assembly, the mounting system comprising:
    a computer securing member configured to be secured to a medical computer, the computer securing member having a base and a top flange;
    a universal bracket member configured to be coupled to the computer securing member, the universal bracket member having a computer compartment configured to receive the medical computer and the computer securing member;
    wherein the universal bracket member includes a mounting interface comprising a plurality of mounting apertures;
    wherein the universal bracket member is configured to engage a mounting bracket associated with a hospital boom assembly;
    wherein a vertical slot is formed in the universal bracket member; and
    wherein the computer compartment of the universal bracket member is configured to house a first portion of the computer securing member and the vertical slot is configured to allow a second portion of the computer securing member to extend therethrough.

2. The mounting system of claim 1, wherein the computer securing member includes an accessory holding region.

3. The mounting system of claim 2, wherein the accessory holding region includes a plurality of hook members.

4. The mounting system of claim 1, wherein the mounting apertures are arranged in a pattern configured to be secured a plurality of different mounting brackets.

5. A medical system, comprising:
    a boom assembly, the boom assembly including a frame and one or more displays coupled to the frame;
    a mounting bracket coupled to the frame;
    a mounting system coupled to the mounting bracket, the mounting system comprising:
        a computer securing member configured to be secured to a medical computer, the computer securing member having a base and a top flange,
        a universal bracket member configured to be coupled to the computer securing member, the universal bracket member having a computer compartment configured to receive the medical computer and the computer securing member, wherein the universal bracket member includes a mounting interface comprising a plurality of mounting apertures;

wherein a vertical slot is formed in the universal bracket member; and wherein the computer compartment of the universal bracket member is configured to house a first portion of the computer securing member and the vertical slot is configured to allow a second portion of the computer securing member to extend therethrough.

6. The system of claim 5, wherein the computer securing member includes an accessory holding region.

7. The system of claim 6, wherein the accessory holding region includes a plurality of hook members.

8. The system of claim 5, wherein the mounting apertures are arranged in a pattern configured to be secured a plurality of different mounting brackets.

9. The system of claim 5, wherein the mounting apertures are configured to receive fasteners.

10. The system of claim 5, wherein the mounting bracket includes a plurality of mounting bracket apertures and wherein the mounting apertures are aligned with the mounting bracket apertures.

11. A method for mounting a medical computer to a hospital boom system, the method comprising:

securing a medical computer to a computer securing member, the computer securing member having a base and a top flange;

coupling the medical computer and the computer securing member to a universal bracket member;

wherein coupling the medical computer and the computer securing member to a universal bracket member includes disposing the medical computer and the computer securing member within a computer compartment defined within the universal bracket member;

wherein the universal bracket member includes a mounting interface comprising a plurality of mounting apertures;

securing the universal bracket member to a mounting bracket associated with a hospital boom assembly;

wherein a vertical slot is formed in the universal bracket member; and wherein the computer compartment of the universal bracket member is configured to house a first portion of the computer securing member and the vertical slot is configured to allow a second portion of the computer securing member to extend therethrough.

12. The method of claim 11, wherein the mounting apertures are arranged in a pattern configured to be secured a plurality of different mounting brackets.

13. The method of claim 11, wherein the mounting apertures are configured to receive fasteners.

14. The method of claim 11, wherein the mounting bracket includes a plurality of mounting bracket apertures and wherein the mounting apertures are aligned with the mounting bracket apertures.

* * * * *